(12) United States Patent
Srivastava et al.

(10) Patent No.: US 11,825,361 B2
(45) Date of Patent: Nov. 21, 2023

(54) INTER-AMF CONNECTED MODE HANDOVER OPTIMIZATION

(71) Applicant: Cisco Technology, Inc., San Jose, CA (US)

(72) Inventors: Anal Srivastava, Cupertino, CA (US); Sangram Kishore Lakkaraju, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 75 days.

(21) Appl. No.: 17/521,280

(22) Filed: Nov. 8, 2021

(65) Prior Publication Data

US 2023/0143182 A1    May 11, 2023

(51) Int. Cl.
*H04W 36/00* (2009.01)
*H04W 36/08* (2009.01)

(52) U.S. Cl.
CPC ....... *H04W 36/0072* (2013.01); *H04W 36/08* (2013.01)

(58) Field of Classification Search
CPC .......................... H04W 36/0072; H04W 36/08
See application file for complete search history.

(56) References Cited

U.S. PATENT DOCUMENTS

| | | |
|---|---|---|
| 2020/0107213 A1 | 4/2020 | Park et al. |
| 2020/0314701 A1 | 10/2020 | Talebi Fard et al. |
| 2021/0029597 A1 | 1/2021 | Xu et al. |
| 2021/0112620 A1* | 4/2021 | Yin ...................... H04W 76/30 |
| 2021/0120459 A1* | 4/2021 | Yu ..................... H04W 36/0055 |
| 2021/0153013 A1 | 5/2021 | Ben Henda et al. |
| 2021/0258275 A1* | 8/2021 | Starsinic ................ H04L 67/12 |
| 2022/0052772 A1* | 2/2022 | Yang .................... H04B 17/345 |
| 2022/0150784 A1* | 5/2022 | Ying ................. H04W 36/0033 |

(Continued)

FOREIGN PATENT DOCUMENTS

WO    2020191333 A1    9/2020

OTHER PUBLICATIONS

3GPP "3rd Generation Partnership Project; Technical Specification Group Services and System Aspects; System architecture for the 5G System (5GS); Stage 2 (Release 17)," 3GPP TS 23.501 V17.2.0, Sep. 2021, 542 pages.

(Continued)

*Primary Examiner* — Chi H Pham
*Assistant Examiner* — Ji-Hae Yea
(74) *Attorney, Agent, or Firm* — Edell, Shapiro & Finnan, LLC

(57) ABSTRACT

A target Access and Mobility Management Function (AMF) switches the path for network traffic to a User Equipment (UE) in an inter-AMF mobility event. The target AMF obtains a path switch request from a target next generation Node B (gNB). The path switch request includes a UE identifier and a source AMF identifier. The target AMF compares the source AMF identifier with a target AMF identifier, and responsive to a determination that the source AMF identifier is different than the target AMF identifier, the target AMF provides a UE context transfer request to the source AMF. The target AMF obtains the UE context from the source AMF and processes the path switch request to update a core network path for a session of the UE. The target AMF also provides a path switch response to the target gNB.

20 Claims, 7 Drawing Sheets

(56) References Cited

U.S. PATENT DOCUMENTS

2022/0322202 A1* 10/2022 Li .................. H04M 15/8016
2023/0007473 A1* 1/2023 Muthuchamy ........ H04W 12/72

OTHER PUBLICATIONS

3GPP, "3rd Generation Partnership Project; Technical Specification Group Radio Access Network; NG-RAN; Xn application protocol (XnAP) (Release 16)," 3GPP TS 38.423 V16.6.0, Jul. 2021, 464 pages.

3GPP, "3rd Generation Partnership Project; Technical Specification Group Radio Access Network; NG-RAN; Xn signalling transport (Release 16)," 3GPP TS 38.422 V16.0.0, Mar. 2020, 8 pages.

3GPP, "3rd Generation Partnership Project; Technical Specification Group Radio Access Network; NG-RAN; Xn general aspects and principles (Release 16)," 3GPP TS 38.420 V16.0.0, Jul. 2020, 16 pages.

3GPP, "3rd Generation Partnership Project; Technical Specification Group Radio Access Network; NG-RAN; NG Application Protocol (NGAP) (Release 16)," 3GPP TS 38.413 V16.6.0, Jul. 2021, 473 pages.

3GPP, "3rd Generation Partnership Project; Technical Specification Group Radio Access Network; NG-RAN; Architecture description (Release 16)," 3GPP TS 38.401 V16.6.0, Jul. 2021, 79 pages.

3GPP, "3rd Generation Partnership Project; Technical Specification Group Radio Access Network; Evolved Universal Terrestrial Radio Access Network (E-UTRAN); S1 Application Protocol (S1AP) (Release 16)," 3GPP TS 36.413 V16.6.0, Jul. 2021, 424 pages.

3GPP, "3rd Generation Partnership Project; Technical Specification Group Core Network and Terminals; 5G System; Access and Mobility Management Services; Stage 3 (Release 17)," 3GPP TS 29.518 V17.2.0, Jun. 2021, 322 pages.

3GPP, "3rd Generation Partnership Project; Technical Specification Group Services and System Aspects; Procedures for the 5G System (5GS); Stage 2 (Release 17)," 3GPP TS 23.502 V17.1.0, Jun. 2021, 692 pages.

3GPP, "3rd Generation Partnership Project; Technical Specification Group Services and System Aspects; Procedures for the 5G System (5GS); Stage 2 (Release 16)," 3GPP TS 23.502 V16.9.0, Jun. 2021, 614 pages.

* cited by examiner

INTER-AMF CONNECTED MODE HANDOVER OPTIMIZATION

TECHNICAL FIELD

The present disclosure relates to wireless networking systems, particularly managing User Equipment (UE) handovers between Next Generation Radio Access Network (NG-RAN) nodes.

BACKGROUND

Fifth Generation (5G) wireless networks connect User Equipment (UE) to a core network through a Next Generation Radio Access Network (NG-RAN). The core network includes network functions, such as Access and Mobility Management Functions (AMFs) and User Plane Functions (UPFs), to perform services in a service-based architecture as defined in the specifications of the Third Generation Partnership project (3GPP). The network functions of the core network support the coordination, authentication, and management of network traffic for the connected UEs.

The NG-RAN may include multiple Next Generation Node B (gNB) access points that communicate with UEs over radio resources. As conditions surrounding a UE change (e.g., the UE moves to a different geographic area, radio conditions in the area change, etc.) the UE may be handed over to a different gNB to connect to the core network. Different network functions of the core network may be associated with different gNBs of the NG-RAN, leading the network traffic for the UE to take a different path through the core network.

DESCRIPTION OF EXAMPLE EMBODIMENTS

Overview

Figure 1:
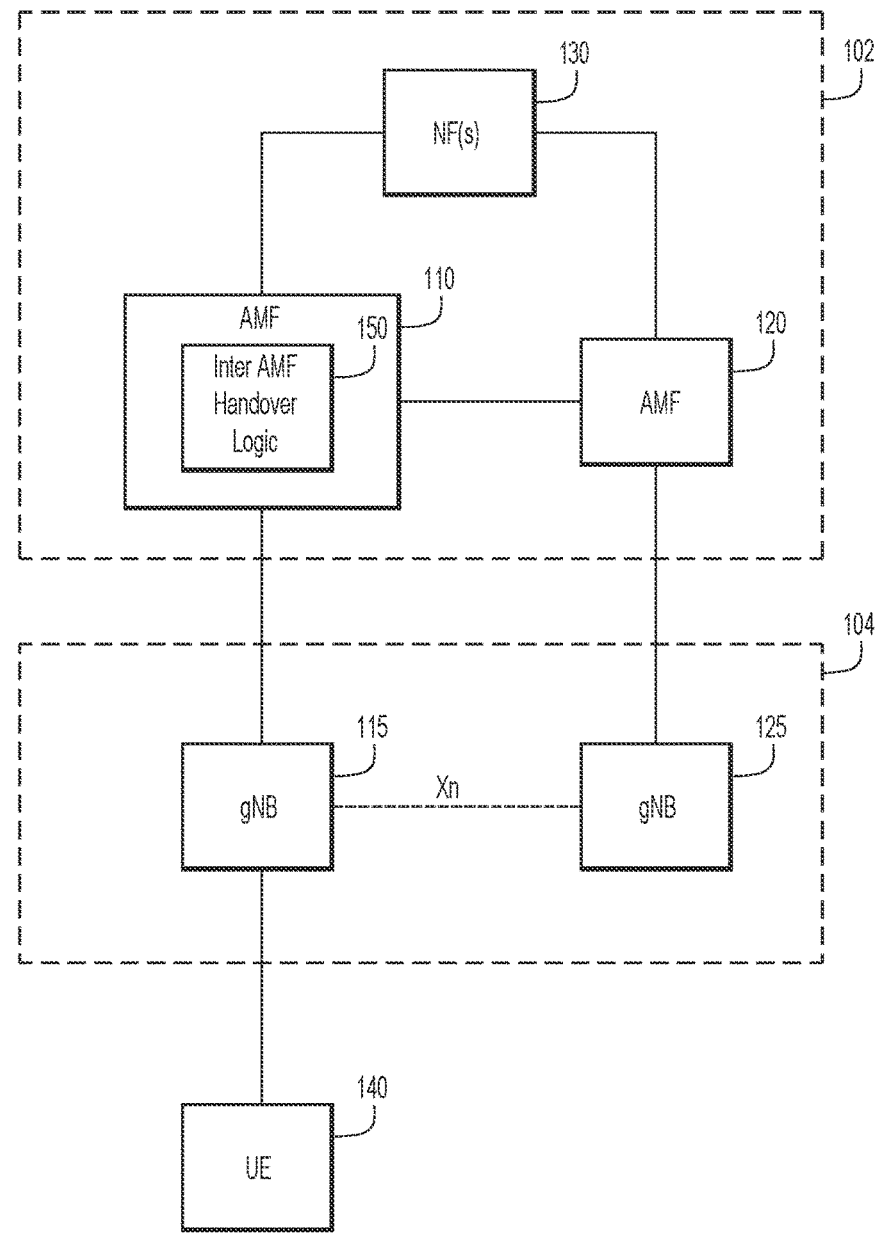
FIG. 1 is a simplified block diagram of a 5G wireless network system configured for inter-AMF handover events, according to an example embodiment.

A computer-implemented method is provided for a target AMF to switch the path for network traffic to a UE in an inter-AMF mobility event. The method includes obtaining at the target AMF, a path switch request from a target gNB associated with the target AMF. The path switch request includes an identifier associated with the UE and a source AMF identifier associated with a source AMF. The method also includes comparing the source AMF identifier with a target AMF identifier associated with the target AMF, and responsive to a determination that the source AMF identifier is different than the target AMF identifier, providing a UE context transfer request to the source AMF. The method further includes obtaining a UE context associated with the UE from the source AMF. The method also includes processing the path switch request to update a core network path for a session of the UE, and providing a path switch response to the target gNB.

Example Embodiments

Enterprise Fifth Generation (5G) wireless networks may experience frequent mobility/handover events for connected User Equipment (UE), for instance, due to small cell size or a small footprint of the Access and Mobility Management Function (AMF) responsibility. For a connected UE, frequent mobility events may lead to inter-AMF connected mode handovers based on each AMF catering to a small number of Next Generation NodeBs (gNBs).

The Third Generation Partnership Project (3GPP) specifications define an N2 handover for inter-AMF mobility that may be appropriate for relatively infrequently mobility events in service provider networks with macro cells. Additionally, the 3GPP specifications define an Xn handover for mobility events between gNBs that are served by the same AMF, i.e., an intra-AMF handover. Typically, an Xn handover exchanges only two messages (e.g., a Path Switch Request message and a Path Switch Request Acknowledge message as described in 3GPP Technical Specification (TS) 23.502 Section 4.9.1.2) between the AMF and the Next Generation Radio Access Network (NG-RAN) nodes (e.g., the gNBs) for the intra-AMF handover. In contrast, an N2 handover typically exchanges five messages between the AMFs and the NG-RAN for an inter-AMF handover (e.g., a handover Required message, a Handover Request message, a Handover Request Acknowledge message, a Handover Command, and a Handover Notify message as described in the 3GPP TS 23.502 Sections 4.9.1.3.2 and 4.9.1.3.3). In other words, the N2 handover procedure involves the core network in the preparation phase and adds additional communication between the core network and the NG-RAN in comparison to the Xn handover procedure, which handles the preparation phase at the NG-RAN without involvement of the core network.

For a private 5G network with significantly more mobility events switching UEs between gNBs served by different AMFs, the extra signaling between the AMF and the gNBs for an N2 handover in comparison to the signaling for an Xn handover may present challenges for the wireless network. The techniques presented herein describe a system in which an Xn handover is used for inter-AMF mobility events in addition to the intra-AMF mobility events defined in the 3GPP specifications.

Referring now to FIG. 1, a simplified block diagram illustrates a 5G network system 100 with a core network 102 and an NG-RAN 104. The core network 102 includes a first AMF 110, a second AMF 120, and one or more additional Network Functions (NFs) 130. In one example, the additional NFs 130 may include one or more Session Management Function (SMF), User Plane Function (UPF), Policy Control Function (PCF), NF Repository Function (NRF), Authentication Server Function (AUSF), Network Exposure Function (NEF), and/or other network functions.

The NG-RAN 104 includes a first gNB 115 and a second gNB 125. The first gNB 115 is connected to the first AMF 110, and the second gNB 125 is connected to the second AMF 120. For the embodiment of FIG. 1, consider that a UE 140 is attached to the first gNB 115, which is associated with/connected to the first AMF 110. The first AMF 110 includes inter-AMF handover logic 150 that enables the first AMF 110 to facilitate an inter-AMF handover for the UE 140 according to the techniques described herein. Although not illustrated in FIG. 1, it is to be understood that the second AMF 120 can also include logic similar to the inter-AMF handover logic 150 in the first AMF 110 to facilitate inter-AMF handovers in accordance with techniques described herein.

In one example, gNB 115 and gNB 125 each respectively connect to a single AMF, e.g., AMF 110 and AMF 120, respectively, which may also be called the serving AMF for each respective gNB. The first AMF 110 and the second AMF 120 may have access to a gNB to AMF mapping that determines the serving AMF for a particular gNB. For instance, the gNB to AMF mapping may indicate that the first AMF 110 is the serving AMF for the gNB 115 and the second AMF 120 is the serving AMF for the second gNB 125. The gNB to AMF mapping may be stored locally on the AMF 110 and/or the AMF 120. Alternatively, the gNB to AMF mapping may be discovered through service discovery (e.g., through an NRF among the NFs 130). The discovery and selection function of the AMF 110 and the AMF 120 may be enhanced to support the discovery of the gNB to AMF mapping. Also shown in FIG. 1, first gNB 115 and second gNB 125 can be interconnected via an Xn connection, which can be established for the gNBs, as discussed in further detail below with reference to FIG. 2.

In another example, the core network 102 establishes core network paths, e.g., to support UE sessions through the nodes of the NG-RAN 104. For instance, the core network 102 may establish a UE data session between a UPF in the NFs 130 and the gNB 115 to which the UE 140 is attached.

Figure 2:
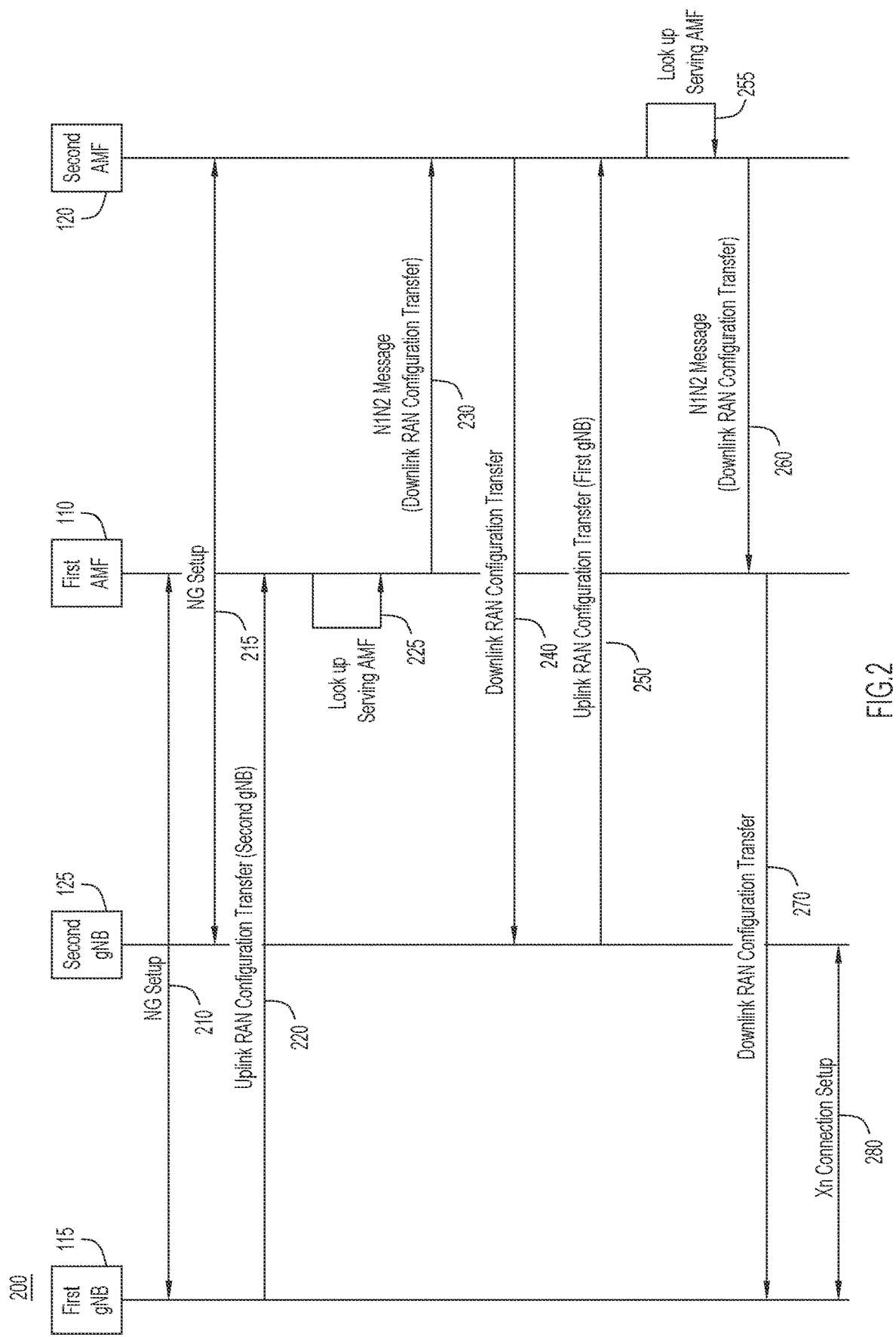
FIG. 2 is a message flow diagram illustrating messages exchanged to facilitate Xn connection setup among two gNBs of a 5G wireless network system to support an inter-AMF handover, according to an example embodiment.

Referring now to FIG. 2, a message flow diagram 200 illustrates messages passed between devices in the 5G network to facilitate Xn connection setup between a first gNB 115 and a second gNB 125, which can be used to facilitate inter-AMF handovers in accordance with embodiments herein. The first gNB 115 is associated with a first AMF 110 through an NG-RAN setup exchange 210. The second gNB 125 is associated with a second AMF 120 through an NG-RAN setup exchange 215. To facilitate Xn connection setup between the first gNB 115 and the second gNB 125, the first gNB 115 sends a message 220 to the first AMF 110 identifying the second gNB 125. In one instance, the first gNB 115 can learn of the presence of the second gNB 125 through neighbor discovery based on UE measurement reports obtained by the first gNB 115 from the UE 140 in which the UE may report transmissions obtained/measured from gNB 125. In response to receiving the message 220, the first AMF 110 determines the serving AMF for the second gNB 125 identified in the message 220. The first AMF 110 sends an inter-AMF message 230 to the second AMF 120 that is the serving AMF for the second gNB 125.

The second AMF 120 updates the configuration of the second gNB 125 with a message 240. The second gNB 125 sends a message 250 back to the second AMF 120 identifying the first gNB 115. The second AMF 120 determines the serving AMF for the first gNB 115 identified in the message 250 and sends an inter-AMF message 260 to the first AMF 110 that is the serving AMF of the first gNB 115. The first AMF 110 updates the configuration of the first gNB 115 with a message 270. Once the configurations of both the first gNB 115 and the second gNB 125 have been updated by their respective serving AMFs (i.e., first AMF 110 and second AMF 120), then the first gNB 115 and the second gNB 125 set up an Xn connection 280, as per 3GPP TS 38.423, Section 8.4, to support handover events between the first gNB 115 and the second gNB 125. Generally, the Xn connection setup exchange between two gNBs, as prescribed per 3GPP TS 38.423, Section 8.4 involves a first gNB sending an Xn Setup Request message to a second gNB that includes the global AMF Region ID to which the first gNB belongs and the second gNB responding with an Xn Setup Response message that includes the global AMF Region ID to which the second gNB belongs.

In one example, one or more messages in the flow diagram 200 may be adapted from the process for setting up an Xn connection between gNBs as described in the 3GPP specifications (e.g., 3GPP TS 38.413 and 38.423). In the 3GPP specifications, gNBs that are connected to the same AMF may use a Next Generation Application Protocol (NGAP) Configuration Transfer procedure to set up Xn connections with neighboring gNBs. For instance, the message 220 from the first gNB 115 to the first AMF 110 may be adapted from an Uplink RAN Configuration Transfer message to identify the second gNB 125 instead of the first gNB 115.

As an enhancement to 3GPP standards based procedures, the first AMF 110 may handle the Uplink RAN Configuration Transfer message 220 by preparing a Downlink RAN Configuration Transfer message and sending it to the serving AMF (e.g., second AMF 120) for the second gNB 125 identified in the Uplink RAN Configuration transfer message 220. At 225, based on the second gNB 125 identified in the Uplink RAN Configuration transfer message, the first AMF 110 can perform a lookup based on the gNB to AMF mapping, which can be locally configured at the first AMF 110 or obtained by the first AMF 110 via a service discovery exchange with an NRF, in order to identify the second AMF 120. In accordance with embodiments herein, the first AMF 110 may send the prepared Downlink RAN Configuration Transfer message to the second AMF 120 using the N1N2 Message Transfer service available on the N14 interface between AMFs. The second AMF 120 may take the N2 container of the N1N2 Message (i.e., message 230) and forward the prepared Downlink Ran Configuration Transfer message 230 to the second gNB 125.

Similarly, when the second gNB 125 sends an Uplink RAN configuration Transfer message 250 identifying the first gNB 115, the second AMF 120 can perform a lookup via a gNB to AMF mapping, as shown at 255, to identify the first AMF 110 serving the first gNB 115. The second gNB 125 prepares a Downlink RAN Configuration Transfer message and sends it to the first AMF 110 with the N1N2 Message Transfer service over the N14 interface as the inter-AMF message 260. The first AMF 110 sends the prepared Downlink RAN Configuration Transfer message 270 to the first gNB 115 enabling the first gNB 115 and the second gNB 125 to set up an Xn connection.

Figure 3:
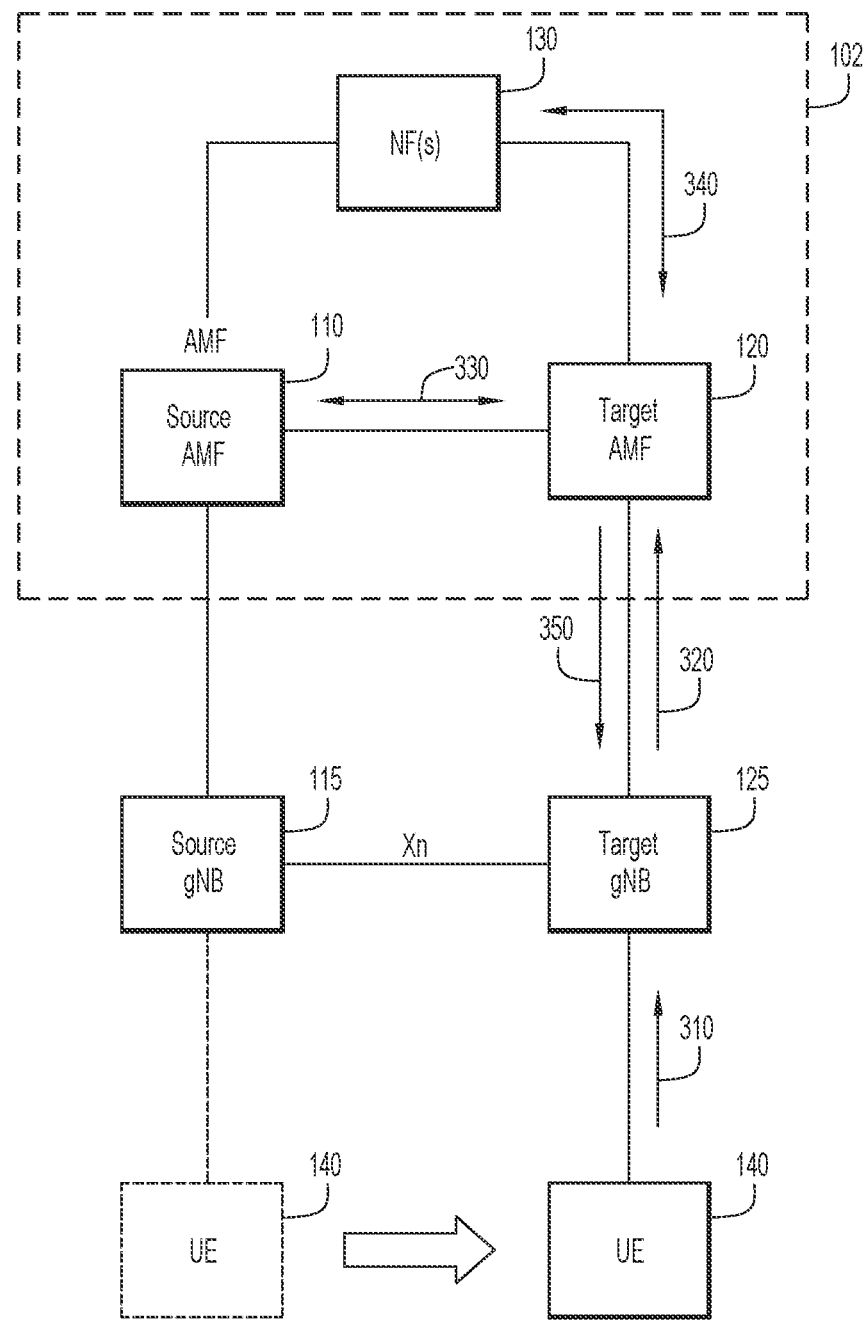
FIG. 3 is a simplified block diagram of a 5G wireless network system transitioning a UE from a source gNB served by a source AMF to a target gNB served by a target AMF, according to an example embodiment.

Referring now to FIG. 3, a simplified block diagram illustrates the core network 102 supporting a mobility event for handing over a UE 140 from a source gNB 115 to a target gNB 125 via an inter-AMF Xn handover, in accordance with an embodiment. When the UE 140 moves from being attached to the source gNB 115 to being attached to the target gNB 125, the UE 140 sends registration message 310 to the target gNB 125. In one example, the registration message 310 may be an exchange of a plurality of messages between the target gNB and the UE 140.

The target gNB 125 sends a message 320 to notify the target AMF 120, which is the serving AMF for the target gNB 125, that the UE 140 has been handed over to the target gNB 125. The message 320 may identify the source gNB 115 or the source AMF 110 to enable the target AMF 120 to transition one or more sessions (e.g., a Protocol Data Unit (PDU) session) established by the UE 140 when it was attached to the source gNB 115 to the target gNB 125. The target AMF 120 communicates with the source AMF 110 in an exchange 330 to obtain the UE context of the UE 140. In one example, the UE context for the UE 140 may include a UE identifier (e.g., Globally Unique Identifier (GUTI) or Permanent Equipment Identifier (PEI)), a subscriber identifier (e.g., Subscription Permanent Identifier (SUPI) or Generic Public Subscription Identifier (GPSI)), a group identifier (e.g., Unified Data Management (UDM) group identifier, an AUSF group identifier, or a PCF group identifier), an indication of the radio capability of the UE 140, an identifier for a Registration Area associated with the UE 140 and/or other information identified in the 3GPP TS 29.518 section 6.1.6.2.25.

After the target AMF 120 obtains the UE context of the UE 140, the target AMF 120 communicates in an exchange 340 with one or more of the NFs 130 to direct the NFs 130 to update a core network path and complete the transfer one or more UE session from the source gNB 115 to the target gNB 125. In one example, the target AMF 120 may direct an SMF among the NFs 130 to update the UE sessions for the UE 140 (e.g., via a session update request). The SMF may then direct a UPF among the NFs 130 to update the core network path for the UE sessions to include the target gNB 125 instead of the source gNB 115. Once the exchange 340 has updated the core network paths of UE sessions in the core network 102, then the target AMF 120 sends a message 350 to the target gNB 125 indicating that the UE sessions for the UE 140 are transitioned from the mobility event.

Figure 4:
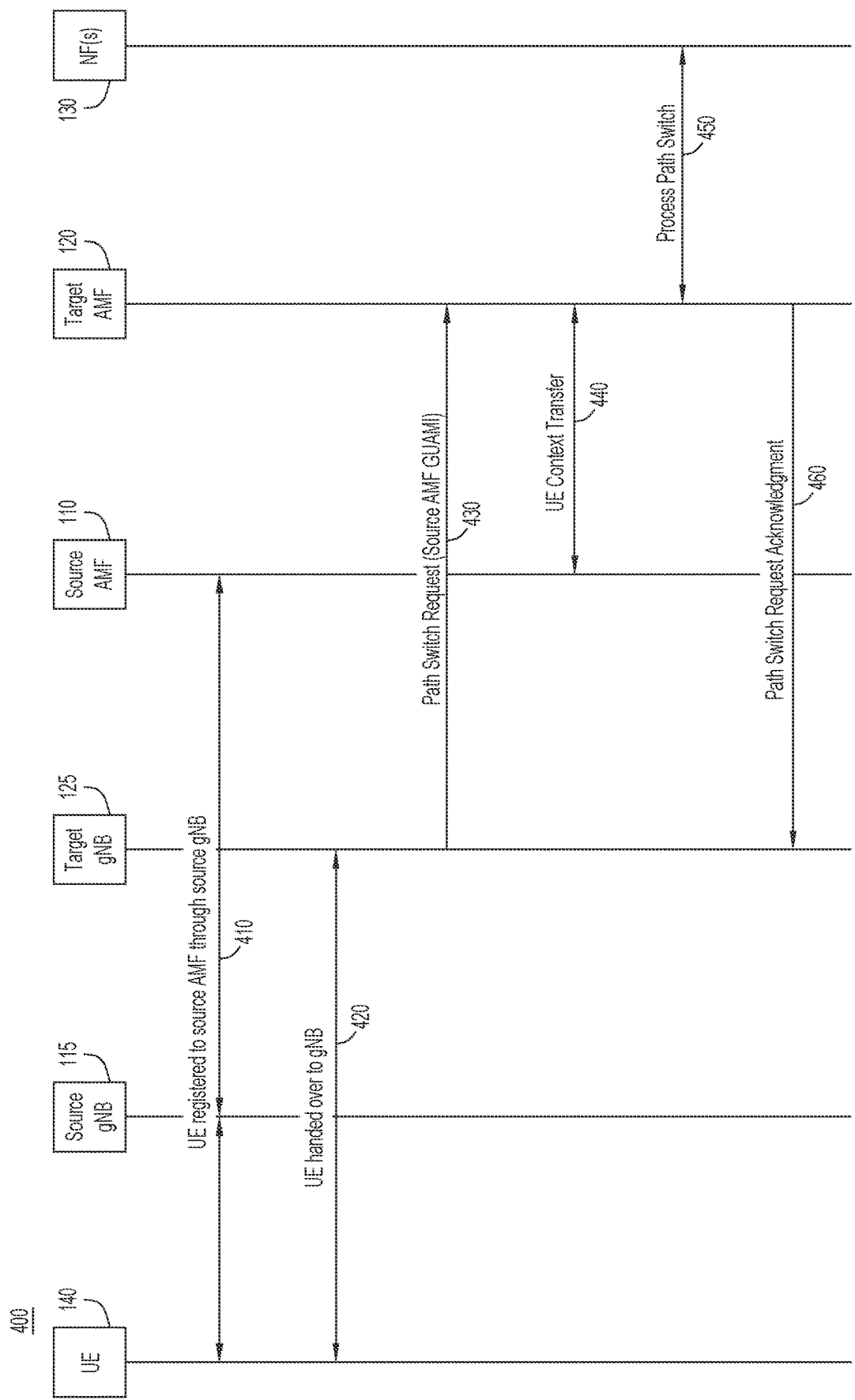
FIG. 4 is a message flow diagram illustrating messages exchanged in transitioning a UE from a source gNB served by a source AMF to a target gNB served by a target AMF, according to an example embodiment.

Referring now to FIG. 4, a message flow diagram 400 illustrates messages passed between devices in a 5G network in response to a mobility event by a UE 140. The UE 140 is initially registered with the source AMF 110 through the source gNB 115 in an exchange 410. In response to changing conditions (e.g., moving to a different geographic area), the source gNB 115 hands the UE 140 over to the target gNB 125 in an exchange 420. In one example, the exchange 420 includes the source gNB 115 detecting the target gNB 125, negotiating with the target gNB 125 to initiate a handover, and beginning to forward UE data from the source gNB 115 to the target gNB 125. For instance, the source gNB 115 may receive measurement reports from the UE 140 indicating that the target gNB 125 is able to provide a stronger wireless connection than the source gNB 115. To ensure the continuation of any UE sessions of the UE 140, the target gNB 125 sends a request 430 to the target AMF 120 to transition the UE sessions in the core network. In one example, the request 430 may include an identifier of the source gNB 115 or an identifier of the source AMF 110.

In response to the request 430, the target AMF 120 obtains the UE context for the UE 140 from the source AMF 110 in an exchange 440. In one example, the target AMF 120 may determine the address of the source AMF 110 through a gNB to AMF mapping, which may be stored on the target AMF 120 or retrieved from a discovery service (e.g., provided by the NFs 130). With the UE context for the UE 140, the target AMF 120 processes the request 430 to update a core network path for the UE sessions in an exchange 450 with the NFs 130. In one example, the exchange 450 may include the target AMF 120 requesting an SMF among the NFs 130 to adjust the core network path of the network traffic to include the target gNB 125. Once the NFs 130 complete the exchange 450 and have updated the core network path to support the UE sessions of the UE 140 through the target gNB 125, then the target AMF 120 sends a response 460 (Path Switch Request Acknowledgment) to the target gNB 125 notifying the target gNB 125 that the request 430 is complete. Although not shown in FIG. 4, obtaining the Path Switch Request Acknowledgment may trigger the target gNB 125 to notify the source gNB 115 to release any resources currently allocated to the UE 140.

In one example, the source gNB 115 and the target gNB 125 have previously established Xn connectivity, as described with respect to FIG. 2. In this example, the source gNB 115 and the target gNB 125 may perform the exchange 420 as an Xn handover. Once the handover is complete from a radio perspective, the UE 140 will be attached to the target gNB 125. The target gNB 125 may send the request 430 as a Path Switch Request to its serving AMF (i.e., target AMF 120) with a new Information Element (IE) identifying the source gNB 115 or the source AMF 110. For instance, the new IE may include the RAN ID of the source gNB 115 or the Globally Unique AMF Identifier (GUAMI) of the source AMF 110. If the Path Switch Request 430 does not include an identifier for the source AMF 110 (e.g., the GUAMI), then the target AMF 120 may determine the serving AMF of the source gNB 115 (e.g., through a gNB to AMF mapping). A GUAMI for a given AMF is structured per 3GPP standards to include a Mobile Country Code (MCC), a Mobile Network Code (MNC), an AMF Region ID, an AMF Set ID, and an AMF pointer that is used to uniquely identify the given AMF, and can be structured as follows: GUAMI:=<MCC><MNC><AMF Region ID><AMF Set ID><AMF Pointer>. Of note, a Path Switch Request as utilized per 3GPP standards for an Xn handover typically includes a list of UE PDU sessions, but does not include the new IE as discussed for embodiments herein that can identify the source gNB or the source AMF.

Based on the Path Switch Request 430 received from the target gNB 125, the target AMF 120 obtains the UE context for the UE 140 from the source AMF 110. In one example, the UE context for the UE 140 may include a UE identifier (e.g., PEI), a subscriber identifier (e.g., a SUPI), an indication of the radio capability of the UE 140, and/or an identifier for a Registration Area associated with the UE 140. After the target AMF 120 obtains the UE context, the target AMF 120 directs the NFs 130 (e.g., SMF, UPF, etc.) to transition UE sessions associated with the UE 140 to a path with the target gNB 125 instead of a path with the source gNB 115. Once the path switch is complete in the core network (e.g., the NFs 130), the target AMF 120 responds to the target gNB 125 with a Path Switch Response 460 to complete the Path Switch Request 430.

Figure 5:
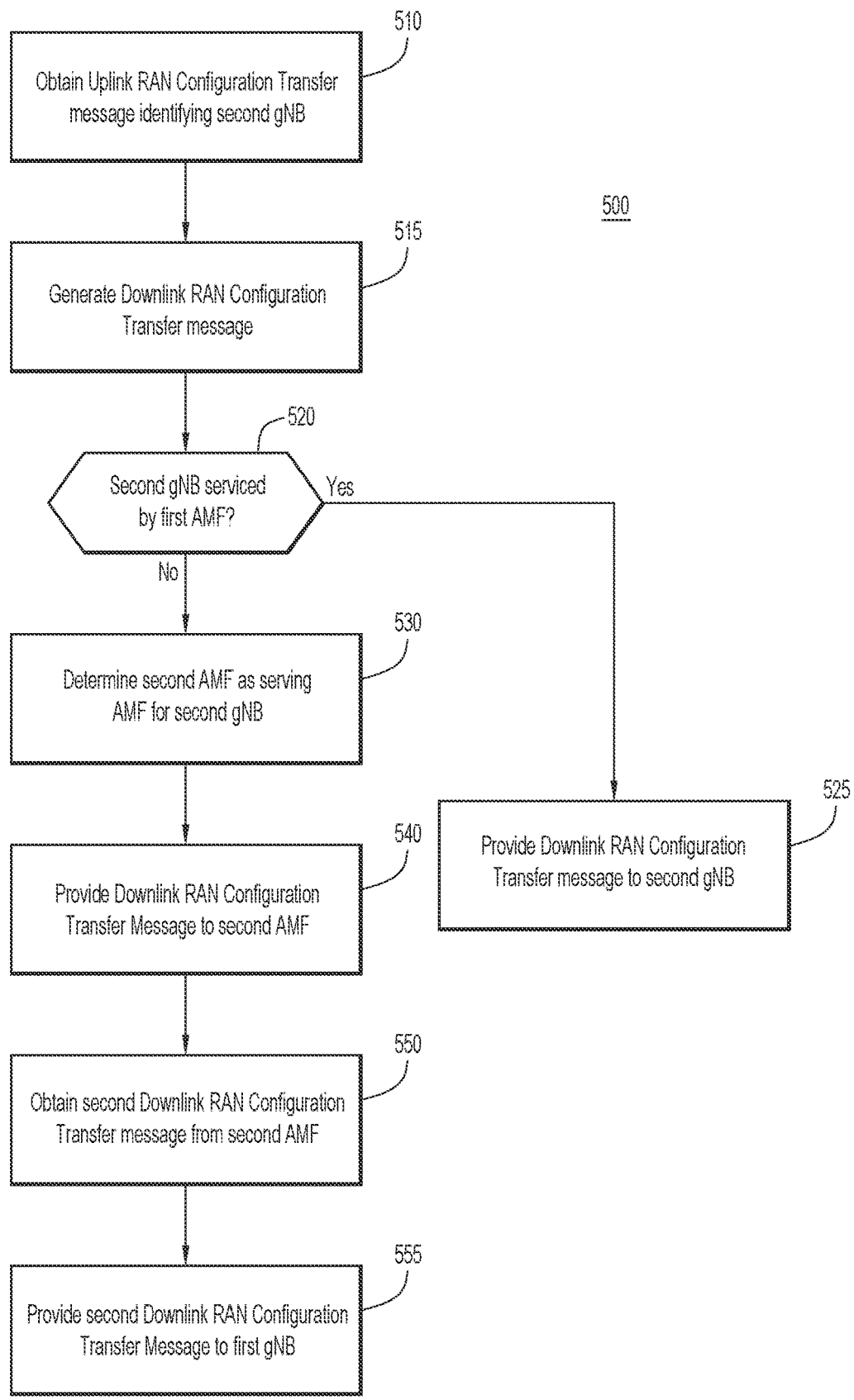
FIG. 5 is a flowchart illustrating operations performed at a source AMF to facilitate an Xn connection setup between two gNBs to support an inter-AMF handover, according to an example embodiment.

Referring now to FIG. 5, a flowchart illustrates operations performed by a serving AMF (e.g., AMF 110 or AMF 120) in a process 500 to facilitate Xn connection setup between NG-RAN nodes (e.g., gNB 115 or gNB 125) to support Xn handovers for UEs in a mobility event. At 510, a first AMF obtains an Uplink RAN Configuration Transfer message from a first gNB. The Uplink RAN Configuration Transfer message identifies a second gNB. The first AMF generates a Downlink RAN Configuration Transfer message at 515. If the first AMF determines that the second gNB identified in the Uplink RAN Configuration Transfer message is serviced by the first AMF at 520 (i.e., preparing for an intra-AMF handover), then the first AMF provides the Downlink RAN Configuration Transfer message to the second gNB at 525.

If the first AMF determines that the second gNB identified in the Uplink RAN Configuration Transfer message is not serviced by the first AMF at 520 (i.e., a handover between the first gNB and the second gNB would be an inter-AMF handover), then the first AMF determines the second AMF is the serving AMF for the second gNB at 530. In one example, the first AMF may determine the identity of the second AMF as the serving AMF for the second gNB through a gNB to AMF mapping, which may be stored on the first AMF. Alternatively, the first AMF may determine the identity for the second AMF through a discovery process involving other NFs (e.g., an NRF). Once the first AMF determines the second AMF is the serving AMF for the second gNB, the first AMF provides the Downlink RAN Configuration Transfer message to the second AMF at 540. The second AMF provides the Downlink RAN Configuration Transfer message to the second gNB to prepare the second gNB for Xn connection setup.

To prepare the first gNB for the Xn connection setup, the first AMF obtains a second Downlink RAN Configuration Transfer message from the second AMF at 550. In one example, the second AMF performs the process 500 to generate the second Downlink RAN Configuration Transfer message. Once the first AMF obtains the second Downlink RAN Configuration Transfer message from the second AMF, the first AMF provides the second Downlink RAN Configuration Transfer message to the first gNB at 555 and an Xn connection setup is triggered between the first gNB and the second gNB, as discussed above.

Figure 6:
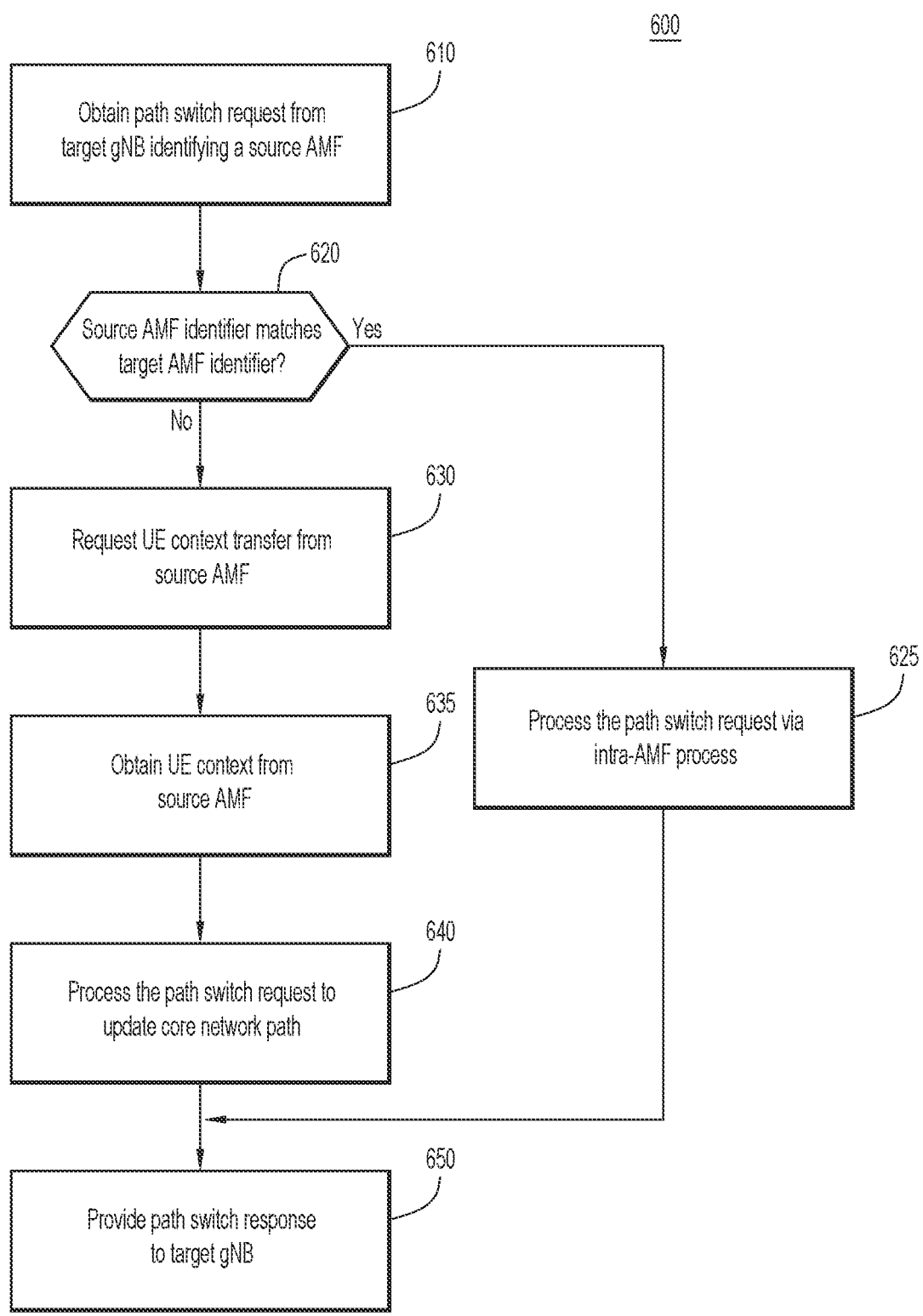
FIG. 6 is a flowchart illustrating operations performed at a target AMF to transition UE sessions from a source gNB served by a source AMF to a target gNB served by the target AMF, according to an example embodiment.

Referring now to FIG. 6, a flowchart illustrates operations performed by a target AMF (e.g., AMF 120) in a process 600 for transitioning user sessions in an inter-AMF handover. At 610 the target AMF obtain a path switch request from a target gNB associated with the target AMF. For the embodiment of FIG. 6, consider that the path switch request identifies a source AMF (e.g., with an IE including a GUAMI of the source AMF) and a UE (e.g., with a UE Next Generation Application Protocol Identifier (UE-NGAP-ID)) that is being transitioned from a source gNB served by the source AMF to a target gNB served by the target AMF. Alternatively, the path switch request may identify the source gNB, which the target AMF uses to identify the source AMF via a gNB to AMF mapping, as discussed herein.

If the source AMF identified in the path switch request matches the target AMF, as determined at 620, then the target AMF processes the path switch request via an intra-AMF handover process at 625. If the source AMF identified in the path switch request does not match the target AMF, as determined at 620, then the target AMF initiates an inter-AMF handover process in which the target AMF sends a request to the source AMF to transfer the UE context of the UE at 630. The target AMF obtains the UE context of the UE from the source AMF at 635.

With the UE context, the target AMF processes the path switch request at 640 to update a core network path for one or more UE sessions, removing the source gNB associated with the source AMF from the core network path. In one example, the target AMF may process the path switch request by directing an SMF to change the path for the user sessions (e.g., PDU sessions) of the UE to include the target gNB instead of the source gNB.

Once the path switch request has been processed by the core network, the target AMF provides a path switch response to the target gNB at 650. In one example, the target AMF may provide a new UE identifier, such as a new UE-NGAP-ID that is assigned by the target AMF instead of by the source AMF.

Figure 7:
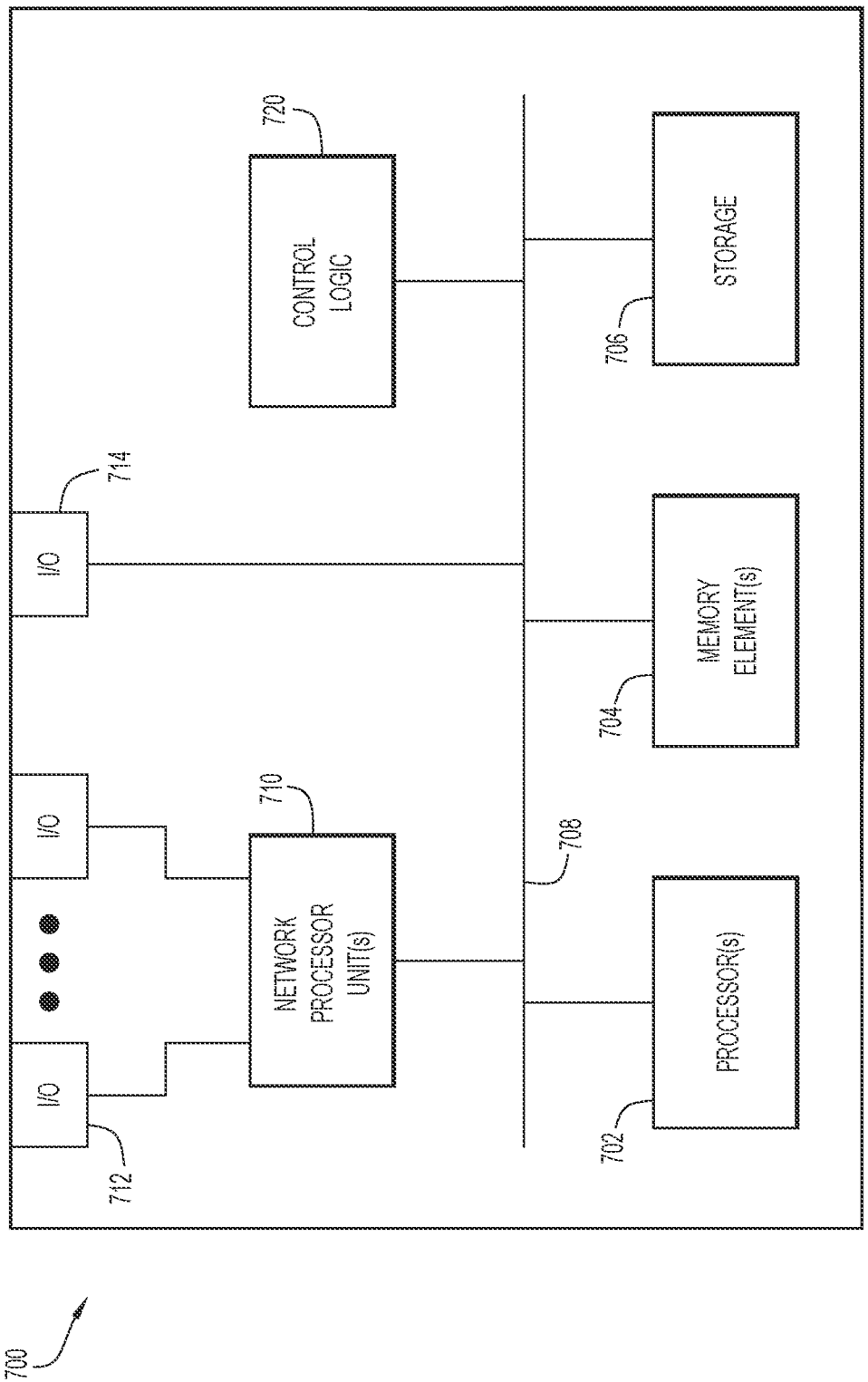
FIG. 7 is a hardware block diagram of a computing device that may perform functions associated with any combination of operations discussed herein in connection with the techniques depicted in FIGS. 1-6.

Referring to FIG. 7, FIG. 7 illustrates a hardware block diagram of a computing device 700 that may perform functions associated with operations discussed herein in connection with the techniques depicted in FIGS. 1-6. In various embodiments, a computing device, such as computing device 700 or any combination of computing devices 700, may be configured as any entity/entities as discussed for the techniques depicted in connection with FIGS. 1-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein optimize UE connected mode mobility for private 5G network deployments. The improvements described herein minimize signaling between the core network and the NG-RAN nodes, which may occur more frequently for small private 5G network deployments in comparison to larger Service Provider 5G deployments with hundreds or thousands of NG-RAN nodes being served by each AMF.

Multiple interfaces of the 5G network are enhanced by the techniques described herein. The N14 interfaces between AMFs is enhanced to support a first AMF requesting a peer AMF to send Downlink RAN Con figuration Transfer messages to a particular gNB served by the peer AMF. The first AMF may use an N1N2 Message Transfer service to send the Downlink RAN Configuration Transfer message to the peer AMF. Additionally, the N14 interface is enhanced to trigger a UE context transfer procedure on receiving a path switch request message, such that the source gNB involved in the handover is served by the peer AMF. Further, the N14 interface may enhanced to include a UE-NGAP-ID as a UE context identifier in N14 messages for UE identification. The N2 interface between NG-RAN nodes and the serving AMF may be enhanced with a new IE identifying the source gNB or source AMF in the path switch request message. For instance, the new IE may carry the RAN ID of the source gNB or the GUAMI of the source AMF.

Additionally, AMF discovery and selection functions may be enhanced to support the UE handover techniques described herein. For instance, the NF profile of an AMF may include a list of gNB served by that AMF. In other words, the NF profile of the AMF that is stored in the NRF of the 5G network deployment may include a gNB to AMF mapping that is discoverable. Enhancing the NF profile of each AMF enables other NFs to discover serving AMFs from the NRF by using a gNB identifier.

In one form, a method is provided for a target AMF to switch the path for network traffic to a UE in an inter-AMF mobility event. The method includes obtaining at the target AMF, a path switch request from a target gNB associated with the target AMF. The path switch request includes an identifier associated with the UE and a source AMF identifier associated with a source AMF. The method also includes comparing the source AMF identifier with a target AMF identifier associated with the target AMF, and responsive to a determination that the source AMF identifier is different than the target AMF identifier, providing a UE context transfer request to the source AMF. The method further includes obtaining a UE context associated with the UE from the source AMF. The method also includes processing the path switch request to update a core network path for a session of the UE, and providing a path switch response to the target gNB.

In another form, an apparatus comprising a network interface and a processor is provided. The network interface is configured to communicate with one or more computing devices. The processor is coupled to the network interface, and configured to obtain at a target AMF, a path switch request from a target gNB associated with the target AMF via the network interface. The path switch request includes an identifier associated with a UE and a source AMF identifier associated with a source AMF. The processor is also configured to compare the source AFM identifier with a target AMF identifier associated with the target AMF, and responsive to a determination that the source AMF identifier is different than the target AMF identifier, the processor is configured to cause the network interface to provide a UE context transfer request to the source AMF. The processor is further configured to obtain a UE context transfer associated with the UE from the source AMF via the network interface. The processor is also configured to process the path switch request to update a core network path for a session of the UE. The processor is further configured to cause the network interface to provide a path switch response to the target gNB.

In still another form, a non-transitory computer readable storage media is provided that is encoded with instructions that, when executed by a processor of computing device, cause the processor to obtain at a target AMF, a path switch request from a target gNB associated with the target AMF. The path switch request includes an identifier associated with a UE and a source AMF identifier associated with a source AMF. The instructions also cause the processor to compare the source AMF identifier with a target identifier associated with the target AMF, and responsive to a determination that the source AMF identifier is different than the target AMF identifier, provide a UE context transfer request to the source AMF. The instructions further cause the processor to obtain a UE context associated with the UE from the source AMF and process the path switch request to update a core network path for a session of the UE. The instructions also cause the processor to provide a path switch response to the target gNB.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims. For instance, the specific IEs described are used as examples of IEs that are currently defined in 3GPP specifications, but the techniques described herein may be adapted to other IEs that may be defined in current or future network specifications.

What is claimed is:

1. A method comprising:
    obtaining at a target Access and Mobility Management Function (AMF), a path switch request from a target next generation Node B (gNB) associated with the target AMF, the path switch request including an identifier associated with a User Equipment (UE) and a source AMF identifier associated with a source AMF, wherein a session of the UE is registered to the source AMF through a source gNB;
    comparing the source AMF identifier with a target AMF identifier associated with the target AMF;
    responsive to a determination that the source AMF identifier is different than the target AMF identifier, providing a UE context transfer request to the source AMF;
    obtaining a UE context associated with the UE from the source AMF;
    processing the path switch request to update a core network path from the source AMF to the target AMF for the session of the UE; and
    providing a path switch response to the target gNB.

2. The method of claim 1, wherein processing the path switch request includes:
    providing a session update request to a Session Management Function (SMF) associated with the session.

3. The method of claim 1, wherein the source AMF identifier is a Globally Unique AMF Identifier (GUAMI) associated with the source AMF.

4. The method of claim 1, further comprising:
    obtaining at the target AMF, a downlink Radio Access Network (RAN) configuration transfer message from the source AMF; and
    forwarding the downlink RAN configuration transfer message to the target gNB.

5. The method of claim 4, further comprising:
    obtaining an uplink RAN configuration transfer message from the target gNB, the uplink RAN configuration transfer message identifying the source gNB;
    determining the source AMF associated with the source gNB;
    generating a second downlink RAN configuration transfer message based on the source AMF; and
    providing the second downlink RAN configuration transfer message to the source AMF.

6. The method of claim 1, wherein the path switch response includes a new identifier for the UE.

7. The method of claim 6, wherein the new identifier is a UE Next Generation Application Protocol Identifier (UE NGAP ID) assigned to the UE by the target AMF.

8. An apparatus comprising:
a network interface configured to communicate with one or more computing device; and
a processor coupled to the network interface, the processor configured to:
   obtain at a target Access and Mobility Management Function (AMF), a path switch request from a target next generation Node B (gNB) associated with the target AMF via the network interface, the path switch request including an identifier associated with a User Equipment (UE) and a source AMF identifier associated with a source AMF, wherein a session of the UE is registered to the source AMF through a source gNB;
   compare the source AMF identifier with a target AMF identifier associated with the target AMF;
   responsive to a determination that the source AMF identifier is different than the target AMF identifier, cause the network interface to provide a UE context transfer request to the source AMF;
   obtain a UE context associated with the UE from the source AMF via the network interface;
   process the path switch request to update a core network path from the source AMF to the target AMF for the session of the UE; and
   cause the network interface to provide a path switch response to the target gNB.

9. The apparatus of claim 8, wherein the processor is configured to process the path switch request by:
providing a session update request to a Session Management Function (SMF) associated with the session.

10. The apparatus of claim 8, wherein the source AMF identifier is a Globally Unique AMF Identifier (GUAMI) associated with the source AMF.

11. The apparatus of claim 8, wherein the processor is further configured to:
   obtain at the target AMF, a downlink Radio Access Network (RAN) configuration transfer message from the source AMF via the network interface; and
   cause the network interface to forward the downlink RAN configuration transfer message to the target gNB.

12. The apparatus of claim 11, wherein the processor is further configured to:
   obtain an uplink RAN configuration transfer message from the target gNB via the network interface, the uplink RAN configuration transfer message identifying the source gNB;
   determine the source AMF associated with the source gNB;
   generate a second downlink RAN configuration transfer message based on the source AMF; and
   cause the network interface to provide the second downlink RAN configuration transfer message to the source AMF.

13. The apparatus of claim 8, wherein the path switch response includes a new identifier for the UE.

14. The apparatus of claim 13, wherein the new identifier is a UE Next Generation Application Protocol Identifier (UE NGAP ID) assigned to the UE by the target AMF.

15. One or more non-transitory computer readable storage media encoded with software comprising computer executable instructions and, when the software is executed on a processor of a computing device, operable to cause a processor to:
   obtain at a target Access and Mobility Management Function (AMF), a path switch request from a target next generation Node B (gNB) associated with the target AMF, the path switch request including an identifier associated with a User Equipment (UE) and a source AMF identifier associated with a source AMF, wherein a session of the UE is registered to the source AMF through a source gNB;
   compare the source AMF identifier with a target AMF identifier associated with the target AMF;
   responsive to a determination that the source AMF identifier is different than the target AMF identifier, provide a UE context transfer request to the source AMF;
   obtain a UE context associated with the UE from the source AMF;
   process the path switch request to update a core network path from the source AMF to the target AMF for the session of the UE; and
   provide a path switch response to the target gNB.

16. The one or more non-transitory computer readable storage media of claim 15, wherein the software is further operable to cause the processor to process the path switch request by causing the processor to:
provide a session update request to a Session Management Function (SMF) associated with the session.

17. The one or more non-transitory computer readable storage media of claim 15, wherein the source AMF identifier is a Globally Unique AMF Identifier (GUAMI) associated with the source AMF.

18. The one or more non-transitory computer readable storage media of claim 15, wherein the software is further operable to cause the processor to:
   obtain at the target AMF, a downlink Radio Access Network (RAN) configuration transfer message from the source AMF; and
   forward the downlink RAN configuration transfer message to the target gNB.

19. The one or more non-transitory computer readable storage media of claim 18, wherein the software is further operable to cause the processor to:
   obtain an uplink RAN configuration transfer message from the target gNB, the uplink RAN configuration transfer message identifying the source gNB;
   determine the source AMF associated with the source gNB;
   generate a second downlink RAN configuration transfer message based on the source AMF; and
   provide the second downlink RAN configuration transfer message to the source AMF.

20. The one or more non-transitory computer readable storage media of claim 15, wherein the path switch response includes a new identifier for the UE, wherein the new identifier is a UE Next Generation Application Protocol Identifier (UE NGAP ID) assigned to the UE by the target AMF.

* * * * *